WAVE TRANSMISSION NETWORK UTILIZING IMPEDANCE INVERSION

Filed Oct. 22, 1952

INVENTOR
J. T. BANGERT
BY
Ralph P. Holcomb
ATTORNEY

Patented May 25, 1954

2,679,633

UNITED STATES PATENT OFFICE 2,679,633

WAVE TRANSMISSION NETWORK UTILIZING IMPEDANCE INVERSION

John T. Bangert, Summit, N. J., assignor to Bell Telephone Laboratories, Incorporated, New York, N. Y., a corporation of New York Application October 22, 1952, Serial No. 316,298

30 Claims. (Cl. 333—80)

This invention relates to wave transmission networks and more particularly to those utilizing a transistor to effect an impedance inversion.

An object of the invention is to invert the impedance of an impedance branch. Further objects are to decrease the size and cost, and improve the transmission characteristics, of wave transmission networks such as filters.

In accordance with the invention, a reactive impedance branch is arranged with a transistor and other component elements to form a two-terminal network which has the property of effectively inverting the impedance of the branch. The transistor is of the type having a base, a collector, and an emitter. The branch to be inverted ordinarily comprises an inductor and a resistor in parallel, and may include one or more additional reactive parallel branches. One end of the branch is connected to one of the network terminals, and the other end is connected through a source of direct voltage and a second resistor, which may be adjustable, to the collector of the transistor. A third resistor is connected between the base and the other network terminal. A feedback is provided between the emitter and a tapping point on the inductor, the two portions of which may be inductively coupled to form an autotransformer. In some applications, it may be desirable to include a blocking capacitor in series with one of the network terminals. By making use of such an impedance inversion, an effective capacitive or inductive reactance which is too large or too small to be realized economically may be obtained from an inductor or a capacitor of ordinary size. Also, the equivalent of a large, high-Q inductor may be provided by using a capacitor of only moderate size. In accordance with a further embodiment of the invention, reactive impedances of this type are used in the branches of wave transmission networks to reduce the size and cost and to improve the transmission characteristics. As examples, band-pass and band-elimination wave filters of the ladder type are disclosed.

Figure 1:
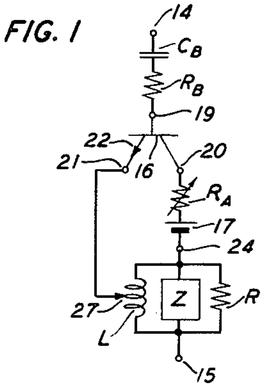
Figure 4:
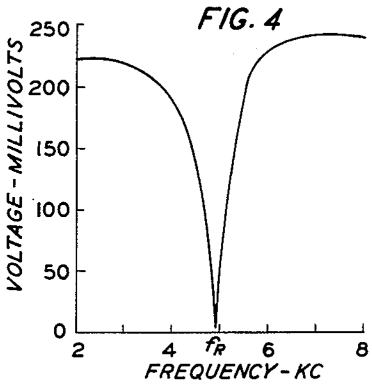
Figure 5:
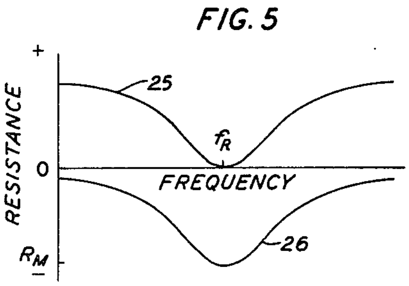
Figure 6:
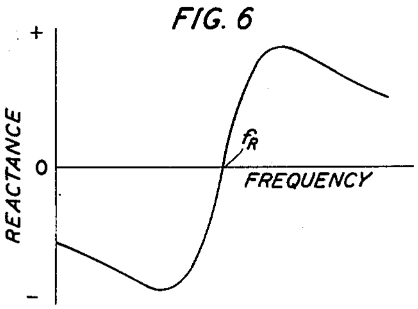
Figure 2:
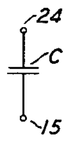
Figure 3:
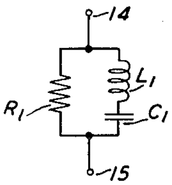
Figure 7:
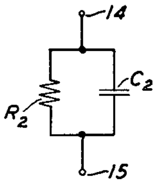
Figure 8:
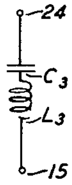
Figure 9:
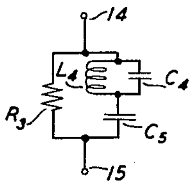
Figure 10:
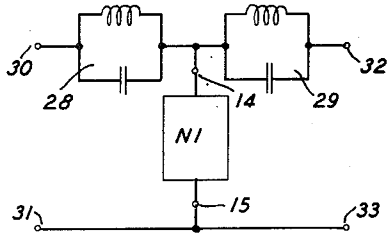
Figure 11:
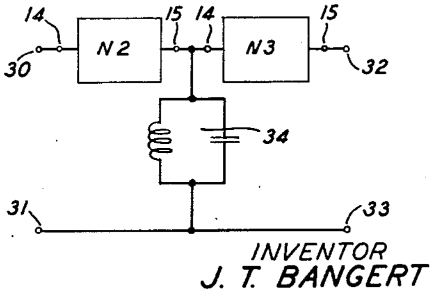

The nature of the invention and its various objects, features, and advantages will appear more fully in the following detailed description of preferred embodiments illustrated in the accompanying drawing, of which Fig. 1 is a schematic circuit of a two-terminal network in accordance with the invention for providing an impedance inversion;

Figs. 2 and 8 are schematic circuits of impedance branches which may constitute the impedance Z shown in Fig. 1;

Figs. 3, 7, and 9 show schematically equivalent impedance branches obtainable with the network of Fig. 1;

Figs. 4, 5, and 6 show, respectively, typical voltage, resistance, and reactance characteristics obtainable with the network of Fig. 1 when the impedance Z is a capacitor; and Figs. 10 and 11 are schematic circuits, respectively, of a band-elimination and a band-pass wave filter embodying the invention.

The embodiment of the impedance-inverting network in accordance with the invention shown schematically in Fig. 1 comprises a pair of terminals 14 and 15 between which are connected a transistor 16, a source of direct voltage 17, a capacitor $C_B$, a general impedance Z, an inductor L, and three resistors R, $R_A$ and $R_B$. The transistor 16 comprises a base, a collector, and an emitter connected, respectively, to the terminals 19, 20, and 21. The transistor may be either of the point-contact type or the junction type, but the latter is preferred because, in general, it provides a more constant value of negative resistance for given applied potentials. Transistors of the junction type are described in detail, for example, in a paper by William Shockley entitled, "The theory of p-n junctions in semiconductors and p-n junction transistors," published in the Bell System Technical Journal, vol. XXVIII, pages 435 to 489, July 1949, and those of the point-contact type in United States Patent 2,524,035, to John Bardeen and Walter H. Brattain, issued October 3, 1950. In Fig. 1, the symbol used for the transistor 16 indicates that it is of the junction type, inasmuch as the arrowhead 22 associated with the emitter points toward the terminal 21. In the symbol for a point-contact transistor, this arrowhead is reversed.

As shown in Fig. 1, the resistor $R_B$ is connected between the transistor base terminal 19 and the network terminal 14. The elements L, R, and Z are connected in parallel between the network terminal 15 and an inner terminal 24, which is connected to the collector terminal 20 through the series combination of the voltage source 17 and the resistor $R_A$. The resistor $R_A$ is preferably made adjustable, as indicated by the arrow, to permit adjustment of the effective resistance of the network, as explained more fully below. In a typical case, the value of $R_A$ may range between zero and 5,000 ohms and the source 17 may be of the order of 22 volts. A feedback path is provided by connecting the emitter terminal 21 to a tapping point 27, preferably the midpoint, on the inductor L. The portions of the inductor L on either side of the point 27 are preferably closely coupled inductively, thus constituting an autotransformer. In some applications, it is desirable to provide a blocking capacitor in series with one of the network terminals to prevent the establishment of an external direct-current path between the terminals 19 and 20 of the transistor. As shown, the capacitor $C_B$ is included between the terminals 14 and 19 for this purpose. It should be large enough that its reactance will be sufficiently small to permit free passage of the alternating currents involved. A typical value for $C_B$ is a half microfarad.

The impedance branch Z may have any of a great variety of configurations. It may, for example be simply a capacitor C, as shown in Fig. 2. In this case, the equivalent circuit of the network of Fig. 1, as seen at the terminals 14 and 15, will be as shown schematically in Fig. 3, comprising a resistor $R_1$ shunted by an arm comprising the series combination of a capacitor $C_1$ and an inductor $L_1$. The relationship between these elements and those appearing in Fig. 1 will be set forth below.

Figs. 4, 5, and 6 show, respectively, typical voltage, resistance, and reactance characteristics, plotted against frequency, obtainable with the network of Fig. 1 when the branch Z is a capacitor C having a value of one-thousandth microfarad, L has an inductance of one henry, $C_B$ has a capacitance of a half microfarad, and R and $R_B$ each have a resistance of 100,000 ohms. Fig. 4 gives the voltage in millivolts across the terminals 14 and 15 when a substantially constant current is supplied to the network. The voltage is, therefore, approximately proportional to the impedance of the network. It is seen that the characteristic dips sharply to a low value at the frequency $f_R$, indicating that the impedance is series resonant at this frequency. The fact that the impedance is series resonant is confirmed by the resistance characteristics shown in Fig. 5, which have minimum values at $f_R$, and the reactance characteristic shown in Fig. 6, which passes through zero with a steep positive slope at $f_R$. In Fig. 5, the upper resistance curve 25, which falls just to zero at $f_R$, is obtained with a fixed value of $R_B$ and a certain critical setting of the adjustable resistor $R_A$. If the value of $R_A$ is increased, the curve is raised, and if it is decreased, the curve is lowered, without materially altering its shape. The lower curve 26 shows that the resistance of the network can be made negative throughout the frequency range of interest. The curve 26 may, for example, represent the resistive component of the impedance between the terminals 14 and 15 when $R_B$ is zero. The curve 25 is obtained when $R_B$ is made equal in magnitude to the maximum negative value $R_M$ of the curve 26. If a portion of the curve is negative, the network becomes a source of energy, derived from the battery 17, which may be used to compensate undesired energy dissipation in other impedance branches associated therewith. Examples are the filter circuits shown in Figs. 10 and 11, described below.

There will now be presented a suggested procedure for designing the network of Fig. 1 to have the equivalent circuit shown in Fig. 3. It will be assumed that the desired values of $C_1$, $L_1$, and $R_1$ are known. In Fig. 1, it is assumed that the capacitance of $C_B$ is infinite and that the impedance branch Z is a capacitance C. The value of $R_B$ is known at once, because $$R_B=R_1 \quad (1)$$

The value of R is selected in accordance with the best judgment of the designer, keeping in mind that, as R increases, L tends to increase and C tends to decrease, and vice versa. The design formulas for C and L may be simplified by first finding the value of a fictitious resistance $R_F$ which depends upon R and the difference between the collector resistance $r_c$ and mutual resistance $r_m$ of the transistor 16, and is given by $$R_F=\frac{4(r_c-r_m)R}{4(r_c-r_m)+R} \quad (2)$$

Now, C and L are found from the formulas $$C=L_1/R_1R_F \quad (3)$$

and $$L=R_1R_FC_1 \quad (4)$$

The only element yet to be determined is $R_A$. The proper setting for $R_A$ may be found by applying to the network a substantially constant current of the frequency $f_R$ at which $L_1$ and $C_1$ are resonant, observing the voltage across the terminals 14 and 15 by means of an oscilloscope or vacuum-tube voltmeter, and adjusting $R_A$ for a voltage minimum of the type shown in Fig. 4.

The derivation of the above design formulas is too lengthy and too involved to be presented herein but it is based on the assumptions that the tapping point 24 of the autotransformer L is at the electrical midpoint and that the two halves of the winding have perfect inductive coupling, and the further assumption that the resistance $R_A$ and the base resistance and the emitter resistance of the transistor 16 are each small enough, when compared with other resistances such as the collector resistance $r_c$ or the mutual resistance $r_m$, to be neglected. The actual performance of networks designed in accordance with the formulas shows that these assumptions are reasonable.

As an example of the application of the formulas, a network as shown in Fig. 1 in which $C_B$ is infinite and Z is constituted by C has been designed to have the equivalent circuit shown in Fig. 3, with the following assumed values:

$$C_1=9.6 \text{ micromicrofarads} \quad (5)$$
$$L_1=91 \text{ henries} \quad (6)$$
$$R_1=100{,}000 \text{ ohms} \quad (7)$$

From Equation 1, $R_B$ is 100,000 ohms. The value of R is selected as 100,000 ohms. Assuming that the difference between $r_c$ and $r_m$ is 325,000 ohms, a value readily attainable in a junction-type transistor, $R_F$ is found from Equation 2 to be $$R_F=\frac{4(325{,}000)(100{,}000)}{4(325{,}000)+100{,}000}=92{,}800 \text{ ohms} \quad (8)$$

Using Equations 3 and 4, $$C=91/(100{,}000)(92{,}800)=0.0098 \text{ microfarad} \quad (9)$$

and $$L=(100{,}000)(92{,}800)(9.6)(10^{-12})=0.089 \text{ henry} \quad (10)$$

The required setting for the adjustable resistor $R_A$ is found by trial as explained above.

By noting the assumed values in the equivalent circuit it can be seen that the inductor $L_1$ would be large and bulky and the capacitor $C_1$ would be small and sensitive to stray variations. Hence, both would be costly and difficult to obtain physically. However, the values of C and L, as given by (8) and (9), required for use in the network are easily obtainable in ordinary reactors. The ratio of C to $C_1$ is greater than a thousand and the ratio of $L_1$ to L is the same. Furthermore, it is evident from Equations 2, 3, and 4 that this ratio may be changed within wide limits by choosing a different value for R or by selecting a transistor in which the difference between $r_c$ and $r_m$ has some other value than that assumed.

As already suggested, it is not necessary that the impedance branch Z in Fig. 1 be constituted by a capacitor. The branch may be omitted entirely, in which case the equivalent circuit of the network will be as shown schematically in Fig. 7, comprising a capacitor $C_2$ shunted by a resistor $R_2$.

As another example the branch Z may be constituted by a capacitor $C_3$ in series with an inductor $L_3$, as shown schematically in Fig. 8. Fig. 9 shows the equivalent circuit of the network, comprising a resistor $R_3$ shunted by an arm made up of a capacitor $C_5$ in series with the parallel combination of a capacitor $C_4$ and an inductor $L_4$.

As a further extension of the invention, one or more networks of the type shown in Fig. 1 may be incorporated in the impedance branches of a wave transmission network to reduce its size and cost and improve the transmission characteristic. As an example, Fig. 10 shows a band-elimination wave filter section of the unbalanced ladder type comprising two parallel-resonant series branches 28 and 29 and an interposed shunt branch N1 connected between a pair of input terminals 30, 31 and a pair of output terminals 32, 33. The network N1 is of the type shown in Fig. 1 between the terminals 14 and 15, with the branch Z constituted by a capacitance C. The equivalent circuit of N1 will, therefore, be of the type shown in Fig. 3. If the shunting resistor $R_1$ is chosen sufficiently large, the reactance of N1, as shown in Fig. 6, will simulate quite closely, over the frequency range of interest, the characteristic required for the shunt branch of the filter. Over this range, the reactance will, in fact, be essentially that of a capacitor $C_1$ and an inductor $L_1$ in series. For a certain critical setting of the resistor $R_A$, the resistive characteristic of N1 will be as shown by the curve 25 of Fig. 5, just touching zero at the resonant frequency $f_R$. In this case, N1 will act as a very high-Q, series-resonant circuit, but will supply no external energy. However, if $R_A$ is reduced in value, the resistance may be made negative over part or all of the frequency range of interest, as shown by the curve 26 of Fig. 5, which means that N1 is capable of furnishing external energy. The resistance $R_A$ may be set at a value such that the energy drawn from the network N1 is of the right amount to compensate the undesired energy dissipation in the series branches 28 and 29, thus further reducing and flattening the loss of the filter in the transmission band and sharpening the cut-offs.

As another example, Fig. 11 shows a band-pass filter section of the ladder type comprising two series-connected networks N2 and N3, which may be similar to N1 described above, and an interposed parallel-resonant shunt branch 34. Here, again, the networks N2 and N3 may be designed and adjusted to provide series-resonant impedances which are, in effect, substantially dissipationless. Also, if desired, the resistor $R_A$ may be so set that the proper amount of negative resistance is furnished by N2, N3, or both, to compensate the energy dissipation in the shunt branch 34 and thus greatly improve the transmission characteristic of the filter.

It is to be understood that the above-described arrangements are illustrative of the application of the principles of the invention. Numerous other arrangements may be devised by those skilled in the art without departing from the spirit and scope of the invention.

What is claimed is:

1. A network comprising two terminals, a transistor having a base, a collector, and an emitter, a resistor connected between one of said terminals and said base, an electrical path between said collector and the other of said terminals, said path including a source of voltage in series with the parallel combination of a second resistor and an inductor, and a feedback path between said emitter and a tapping point on said inductor.

2. A network in accordance with claim 1 which includes a third resistor connected in series with said source.

3. A network in accordance with claim 2 in which said third resistor is adjustable.

4. A network in accordance with claim 1 in which the portions of said inductor on either side of said tapping point are inductively coupled.

5. A network in accordance with claim 1 in which said tapping point is approximately the electrical midpoint of said inductor.

6. A network in accordance with claim 1 in which said parallel combination includes an additional parallel impedance branch.

7. A network in accordance with claim 6 in which said additional branch is reactive.

8. A network in accordance with claim 6 in which said additional branch comprises a capacitor.

9. A network in accordance with claim 6 in which said additional branch comprises a capacitor and a second inductor.

10. A network in accordance with claim 6 in which said additional branch comprises a capacitor and a second inductor connected in series.

11. A network in accordance with claim 1 in which said transistor is of the junction type.

12. A network in accordance with claim 1 which includes a blocking capacitor connected in series with one of said terminals.

13. A network in accordance with claim 1 in which said transistor has a base resistance and an emitter resistance each of which is small compared to either the collector resistance or the mutual resistance of said transistor.

14. A network comprising two terminals, a transistor having a base, a collector, and an emitter, a resistor connected between one of said terminals and said base, the parallel combination of a second resistor, a capacitor, and an inductor, connected at one end to the other of said terminals, a source of voltage and a third resistor connected in series between the other end of said parallel combination and said collector, and a feedback path between said emitter and a tapping point on said inductor.

15. A network in accordance with claim 14 in which said third resistor is adjustable.

16. A network in accordance with claim 14 in which the resistance of said third resistor is so chosen that the resistance of the network is substantially zero at one frequency only.

17. A network in accordance with claim 14 in which the resistance of said third resistor is so chosen that the resistance of the network is negative over a range of frequencies.

18. A network in accordance with claim 14 in which said transistor is of the junction type.

19. A network in accordance with claim 14 in which the portions of said inductor on either side of said tapping point are inductively coupled.

20. A network in accordance with claim 14 in which said tapping point is approximately the electrical midpoint of said inductor.

21. A network in accordance with claim 14 which includes a blocking capacitor connected in series with one of said terminals.

22. A network in accordance with claim 14 in which said transistor has a base resistance and an emitter resistance each of which is small compared to either the collector resistance or the mutual resistance of said transistor.

23. A network in accordance with claim 22 in which the resistance of said third resistor is small compared to either said collector resistance or said mutual resistance.

24. A network the equivalent circuit of which may be represented by a resistance $R_1$ shunted by the series combination of capacitance $C_1$ and an inductance $L_1$, said network comprising a transistor having a base, a collector, and an emitter, a resistance $R_B$ connected between one of said terminals and said base, the parallel combination of a resistance R, a capacitance C, and an inductance L connected at one end to the other of said terminals, a resistance $R_A$ and a source of voltage connected in series between the other end of said parallel combination and said collector, and a feedback path between said emitter and approximately the midpoint of said inductance, $R_B$, C, and L having approximately the following values:

$$R_B=R_1$$

$$C=L_1/R_1R_F$$

and $$L=R_1R_FC_1$$

where $$R_F=\frac{4(r_c-r_m)R}{4(r_c-r_m)+R}$$

and $r_c$ and $r_m$ are, respectively, the collector resistance and the mutual resistance of said transistor.

25. A network in accordance with claim 24 in which $R_A$ has a value so chosen that the resistance of the network is substantialy zero at the resonant frequency of $C_1$ and $L_1$.

26. A network in accordance with claim 24 in which $R_A$ has a value so chosen that the network has a negative resistance.

27. A network in accordance with claim 24 in which the two halves of said inductance are inductively coupled.

28. A network in accordance with claim 24 in which said transistor is of the junction type.

29. A network in accordance with claim 24 which includes a blocking capacitor connected in series with one of said terminals.

30. A network in accordance with claim 24 in which $R_A$ and the base resistance and the emitter resistance of said transistor are each small compared to either $r_c$ or $r_m$.

References Cited in the file of this patent

UNITED STATES PATENTS

| Number | Name | Date |
| --- | --- | --- |
| 1,725,154 | Marsteller | Aug. 20, 1929 |
| 1,772,506 | Affel | Aug. 12, 1930 |
| 2,505,266 | Villem | Apr. 25, 1950 |
| 2,544,211 | Barton | Mar. 6, 1951 |
| 2,556,286 | Meacham | June 12, 1951 |
| 2,570,939 | Goodrich | Oct. 9, 1951 |